March 4, 1930. F. W. SADLER ET AL 1,749,676
SHADE ATTACHMENT FOR GOGGLES AND OTHER EYEGLASSES
Filed Oct. 13, 1927
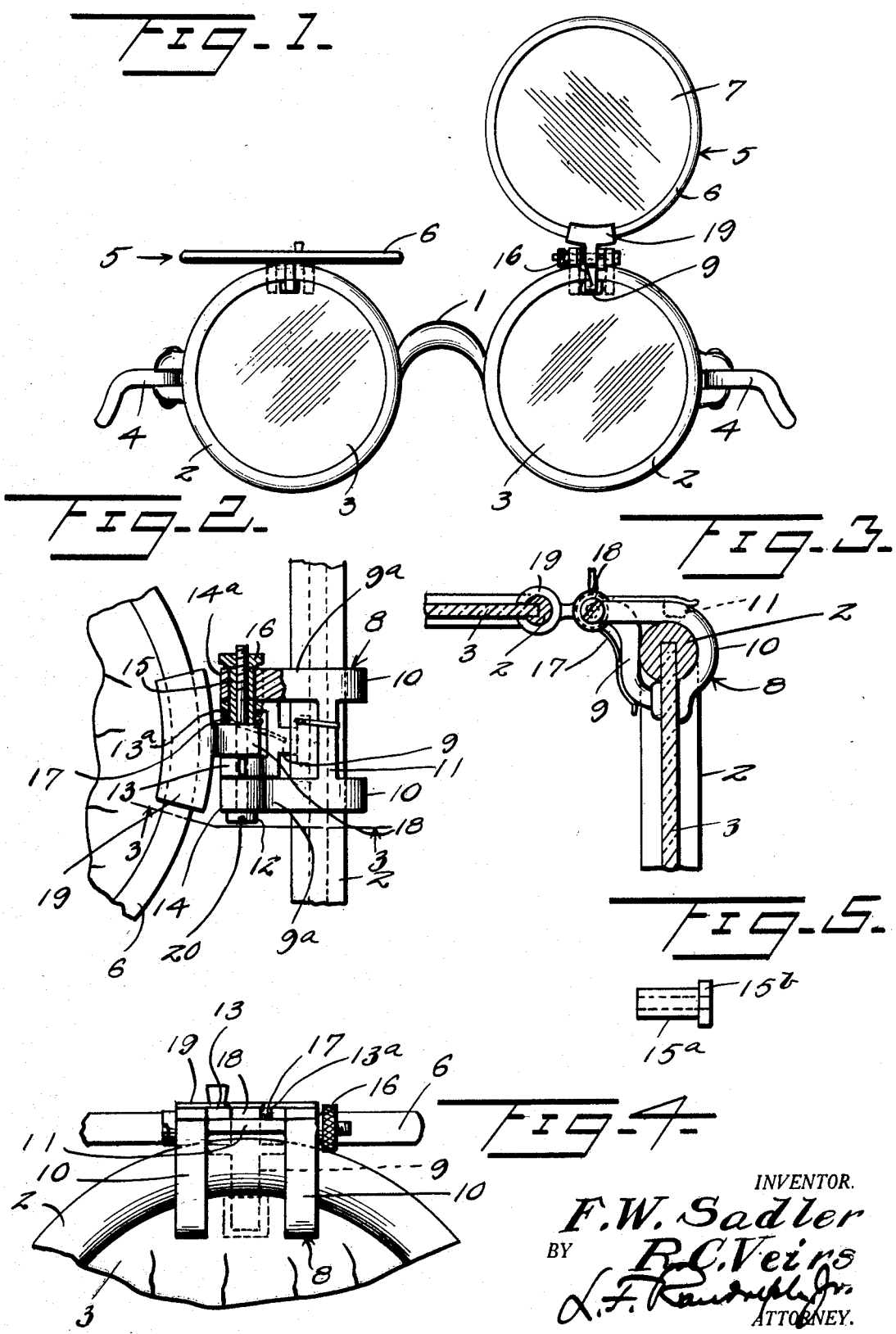
INVENTOR.
F. W. Sadler
BY P. C. Veirs
L. F. Randolph Jr.
ATTORNEY.

Patented Mar. 4, 1930

1,749,676

UNITED STATES PATENT OFFICE

FREDERICK W. SADLER AND ROBERT C. VEIRS, OF OKLAHOMA CITY, OKLAHOMA

SHADE ATTACHMENT FOR GOGGLES AND OTHER EYEGLASSES

Application filed October 13, 1927. Serial No. 225,965.

This invention relates to goggles and has for one of its objects to provide an article of this character having clear glasses and transparent shades, the latter being adapted to protect the eyes from the sun, road glare and the blinding headlights of automobiles and being adapted to be readily adjusted into and out of position for use.

A further object of the invention is to provide an article of the character stated wherein the shades may be readily adjusted in to a position or positions which will afford the maximum protection for the eyes, the shades being adapted to be adjusted to position them above or at one side or in front of the glasses and being adapted in any adjusted position thereof to occupy any angular position with respect to the glasses.

A further object of the invention is to provide novel means through the medium of which the shades may be readily secured to goggles and also spectacles now in use and on the market.

With the foregoing and other objects in view, the nature of which will appear as the description proceeds, the invention consists of the construction, combination and arrangement of parts hereinafter fully described and claimed, and illustrated in the accompanying drawing, wherein:

Figure 1 is a view in front elevation of goggles embodying our invention,

Figure 2 is a view partly in top plan and partly in horizontal section illustrating the manner in which the shades are secured to the goggles, Figure 3 is a sectional view taken on the plane indicated by the line 3—3 of Figure 2, Figure 4 is a view in rear elevation illustrating the manner in which the shades are secured to the goggles, and Figure 5 is an elevational view of a slightly modified form of the sleeve forming a part of the shade securing means.

Referring in detail to the drawing, 1 designates the bridge, 2 the frames, 3 the glasses, 4 the temple bars and 5 the shades of the goggles, the glasses 3 being plain and uncolored or clear.

The shades 5 comprise frames 6 and panels 7 set in the frames. For the purpose of illustrating the panels 7 are provided with frames 6, as stated, but it will be apparent that the panels may be used without frames, such a substitution being obvious. The panels 7 may be made from glass, celluloid or other suitable material and are colored so as to protect the eyes from the sun, road glare and the blinding headlights of automobiles. The shades 5 are pivotally and adjustably connected to the goggles so as to permit them to be readily adjusted into and out of position for use and so as to permit them to be readily adjusted into a position or positions which will afford the maximum protection for the eyes. One or both of the shades 5 may be used, and one or both of them may be adjusted into a position above or at one side or in front of the glasses 3 and may in any adjusted position thereof be arranged at any angle with respect to the glasses.

The means for securing the shades 5 to the spectacles comprise clamps 8 which are slidably connected to the goggles and to which the shades are pivotally connected. The clamps 8 are similar, and each of them consists of a front jaw 9 and a pair of rear jaws 10 connected in relatively spaced relation by a bar 11. The jaws 9 and 10 are pivotally connected by bolts 12, and are formed to embrace the frames 2 and contact with the glasses 3, as clearly shown in Figure 3. The jaws 9 are each provided with a pair of relatively spaced ears 13 and 13$^a$ which are located between the ears 14 and 14$^a$ of the jaws 10. The bolts 12 have a snug fit in the ears 13 and 14, and the openings in the ears 13$^a$ and 14$^a$ are larger diametrically than the bolt so as to adapt them for the slidable reception of sleeve 15 mounted on and threadedly engaged with the bolt. The bolts 12 may be held against endwise displacement by nuts 16 mounted thereon and contacting with the ears 14$^a$ or they may be held against such displacement by providing the sleeves with heads for contact with said ears. A sleeve of this character is shown in Figure 5, wherein 15$^a$ designates the sleeve and 15$^b$ the head thereof. The jaws 9 and 10 are held in firm contact with the frames 2 and glasses 3 by springs 17 which are mounted upon the sleeves 15 or 15ª between the ears 13 and 13ª and which bear against the jaws 9 and the bars 11.

The shades 5 are pivotally connected to the bolts 12 by ears 18 which are positioned upon the bolts 12 between the ears 13 and 13ª and with which the inner ends of the sleeves 15 or 15ª contact. The ears 18 are secured to the frames 6 by clamps 19. The sleeves 15 or 15ª are adjusted inwardly when it is desired to hold the shades 5 against movement with respect to the glasses 3, and they are adjusted outwardly when it is desired to free the shades for adjustment with respect to the glasses. When the sleeves 15 or 15ª are adjusted inwardly they clamp the ears 18 between themselves and the ears 13, and when they are adjusted outwardly they move in a direction away from the ears 18. The sleeves 15 or 15ª are adjusted through the medium of of the bolts 12, and to permit the bolts to be turned through the medium of a screwdriver they are provided with nicks 20. The turning of the bolts 12 in one direction effects the inward adjustment of the sleeve 15 and the turning of the bolts in the opposite direction effects the outward adjustment of the sleeve.

As the jaws 9 and 10 of the clamps 8 are yieldingly held in closed or gripping relation, the clamps may be readily adjusted to position the shades 5 above or at one side or in front of the glasses 3. As the shades 5 are pivotally connected to the clamps 8, and as the clamps frictionally hold the shades against movement, the shades may in any adjusted position thereof be secured in any angular relation to the glasses 3. In Figure 1 one of the shades 5 is shown in a horizontal position above its glass 3, and the other shade is shown in a vertical or non-utile position above its glass 3.

It should be understood that the drawing is merely illustrative of a preferred construction, it being our expectation that various changes and modifications may be made without departing from the spirit and scope of our invention. It should also be understood that the clamps 8 permit the shades 5 to be readily connected to goggles and also to spectacles now in use and on the market, that the term "goggles" as used in the claims includes spectacles and other eyeglasses, and that the term "glasses" as used in the claims includes the plain glasses of goggles and the lenses of spectacles and other eyeglasses.

What is claimed is:—

1. An attachment for goggles comprising shades, means connecting the shades to the goggles for circumferential adjustment with respect to the glasses thereof, and means carried by said first means for securing the shades in adjusted angular positions relatively to the surfaces of said glasses.

2. An attachment for goggles comprising shades having colored and transparent panels, means frictionally connecting the shades to the goggles for circumferential adjustment with respect to the glasses thereof, and means carried by said first means for frictional engagement for securing the shades in adjusted angular positions relatively to the surfaces of said glasses.

3. An attachment for goggles comprising shades, means frictionally and circumferentially adjustably connected to the glasses of the goggles, and means frictionally and adjustably securing the shades to said first means and adapted to secure the shades in adjusted position.

4. An attachment for goggles comprising clamps frictionally and circumferentially adjustable embodying spring pressed jaws and mounted on the glasses of the goggles, shades, and means adjustably securing the shades to the clamps and adapted to secure the shades in adjusted position.

5. An attachment for goggles comprising clamps frictionally and circumferentially adjustably mounted on the glasses of the goggles, bolts carried by the clamps, shades, means pivotally connecting the shades to the bolts, and means associated with the clamps and said first means for securing the shades against movement.

6. An attachment for goggles comprising clamps mounted for circumferential adjustment on the glasses of the goggles, bolts carried by the clamps, shades, means pivotally connecting the shades to the bolts, and clamping members threadedly engaged with the bolts and cooperating with said means to secure the shades against movement.

7. An attachment for goggles comprising clamps embodying jaws and mounted upon the glasses of the goggles, bolts pivotally connecting the jaws, sleeves threadedly engaged with the bolts, shades provided with ears pivotally associated with the bolts, the sleeves being adapted to be moved into contact with the ears to hold the shades against movement, and springs holding the jaws in closed relation.

In testimony whereof we affix our signatures.

FREDERICK W. SADLER.
ROBERT C. VEIRS.